United States Patent [19]

Chuang

[11] Patent Number: 4,852,469

[45] Date of Patent: Aug. 1, 1989

[54] AUTOMATIC VENTING SYSTEM

[76] Inventor: Cliff L. Chuang, 114 Crawford St., Lowell, Mass. 01854

[21] Appl. No.: 157,850

[22] Filed: Feb. 18, 1988

[51] Int. Cl.⁴ .................................................. B60H 1/24
[52] U.S. Cl. ...................................... 98/2.01; 98/2.02; 318/266
[58] Field of Search ........................ 98/2.01, 88.1, 2.02; 49/29, 30, 31; 73/73, 171; 236/49; 318/264, 266, 483, 480; 307/10 AT

[56] References Cited

U.S. PATENT DOCUMENTS

| 3,337,992 | 8/1967 | Tolson | 49/29 |
| 4,139,801 | 2/1979 | Linares | 307/10 LS X |
| 4,481,450 | 11/1984 | Watanabe et al. | 318/480 X |
| 4,527,247 | 7/1985 | Kaiser et al. | 340/870.03 X |
| 4,544,865 | 10/1985 | Sharp | 318/266 X |
| 4,553,656 | 11/1985 | Lense | 49/139 X |

FOREIGN PATENT DOCUMENTS 215116 9/1986 Japan ..................................... 98/2.01

Primary Examiner—Harold Joyce
Attorney, Agent, or Firm—Joseph S. Iandiorio

[57] ABSTRACT

An automatic venting system for an enclosed space such as a vehicle having one or more venting elements. The venting system senses precipitation and commands drive means to close the venting element when precipitation is detected and to open the venting element when precipitation ceases to accomplish passive venting of the enclosed space while minimizing entry of precipitation.

19 Claims, 4 Drawing Sheets

AUTOMATIC VENTING SYSTEM

FIELD OF INVENTION

This invention relates to an automatic venting system for an enclosed space and more particularly to such a venting system for a vehicle which enables passive circulation of air through the vehicle until precipitation is detected.

BACKGROUND OF INVENTION

An enclosed space is rapidly heated by direct sunlight. The temperature inside the enclosed space can be maintained at acceptable levels by opening a window or other vent. When left unattended, however, rain or other precipitation may commence unexpectedly and damage the contents of the enclosed space.

The problem of controlling heat within an enclosed space is particularly severe for automobiles which are often left for extended periods of time in the hot sun. When left with the windows closed, the interior can reach very high temperatures. A driver returning to the vehicle experiences discomfort upon entering the vehicle, and heat retained by the upholstery is not readily dissipated. Further, the temperature can rise sufficiently high to damage objects within the automobile.

One system for vehicles requires a separate set of ducts and blowers to ventilate a vehicle. The system is activated when the ignition switch of the vehicle is thrown to the OFF position and the system runs continuously until the switch is thrown to the ON position. Operation of the blower for an extended period of time places an unacceptable load on the battery of the vehicle.

SUMMARY OF INVENTION

It is therefore an object of this invention to provide an automatic venting system which accomplishes venting of an enclosed space while guarding against entry of precipitation.

It is a further object of this invention to provide such an automatic venting system which can open the vents only when necessary to vent heated air.

Yet another object of this invention is to provide an automatic venting system for a vehicle which controls windows, sunroof or convertible top to ventilate the vehicle when it is unattended.

It is a further object of this invention to provide such a ventilation system which utilizes existing vents in a vehicle.

It is further object of this invention to provide such a system which accomplishes passive venting while minimizing drain on the battery of the vehicle.

This invention results for the realization that a truly effective ventilation system for an enclosed space such as a vehicle can be achieved by opening existing vents in the vehicle to passively circulate air, sensing precipitation, and closing the vents when precipitation is detected to minimize entry of precipitation while maximizing air circulation.

This invention features an automatic venting system for an enclosed space. The venting system includes means for sensing precipitation, at least one venting element communicating with the enclosed space, and means for operating the venting element. There is also control means, responsive to the means for sensing, for commanding the means for operating to close the venting element when precipitation is detected and to open the venting element when precipitation ceases to accomplish venting of the enclosed space while minimizing entry of precipitation.

In one embodiment, the venting system further includes means for determining the temperature of the enclosed space. The control means includes means for commanding the means for operating to open the venting element when the temperature rises above a preselected threshold and when precipitation is not sensed.

This invention also features an automatic venting system for a vehicle, including means for sensing precipitation, means for determining the temperature of the interior of the vehicle, and a plurality of venting elements in communication with the interior of the vehicle. There are also drive means for operating each of the venting elements and control means, responsive to the means for sensing and the means for determining, for commanding in a first mode each drive means to open its corresponding venting element when the interior of the temperature rises above a preselected threshold to accomplish venting of the vehicle. The control means also commands each of the drive means to close its corresponding venting element when precipitation is detected.

In one embodiment, the control means includes means for commanding in a second, security mode each of the drive means to immediately close its venting element regardless of whether precipitation has been sensed. The venting system further includes means for selecting one of the first and second modes for the control means, and means, responsive to the ignition system of the vehicle, for enabling the control means to command the drive means. The venting system may further include timer means, responsive to the means for enabling, for signalling the control means to command closure of the venting elements when a predetermined period has elapsed.

In another embodiment, the venting system further includes means for indicating the mode of the control means, and intruder detection means for placing the control means in the second mode when an intruder is detected. The control means includes means for commanding in a third mode selected ones of the drive means to open corresponding selected vending elements until precipitation is detected and for commanding nonselected ones of the drive means to close corresponding nonselected venting elements regardless of whether precipitation is sensed. The venting system may further include means, actuatable by an operator of the vehicle, for adjusting the preselected threshold of the control means, and each said drive means includes an electric motor.

DISCLOSURE OF PREFERRED EMBODIMENT

Other objects, features and advantages will occur from the following description of a preferred embodiment and the accompanying drawings, in which.

This invention may be accomplished by a system which automatically vents an enclosed space such as a vehicle by operating one or more venting elements of the vehicle in response to the occurrence of precipitation. The system enables air to passively circulate through the interior while minimizing entry of precipitation.

Figure 1:
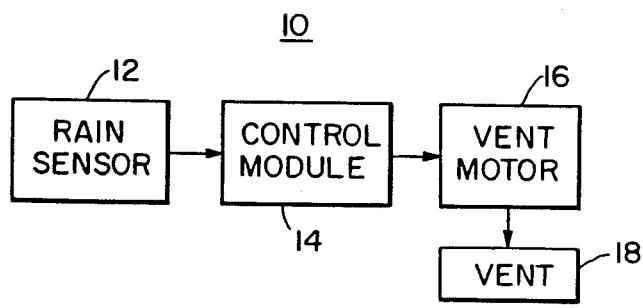
FIG. 1 is a schematic block diagram of a venting system according to this invention.

Automatic venting system 10 according to this invention, FIG. 1, includes rain sensor 12, control module 14, vent motor 16 and vent 18. Rain sensor 12 signals control module 14 when precipitation occurs. Upon receipt of the precipitation signal from rain sensor 12, control module 14 commands vent motor 16 to close vent 18 which communicates with the enclosed space.

In addition to closing vent 18 when precipitation is sensed, control module 14 reopens vent 18 after precipitation has ceased. In one construction, rain sensor 12 is a printed circuit having contacts which are shorted when precipitation falls on the sensor. After the precipitation ceases and the water shorting the contacts evaporates, the reopening of the contacts signals control module 14 that circulation through the enclosed space can be resumed.

In another construction, the opening of the vents is determined by temperature. Control module 14 does not command reopening of vent 18 until the temperature of the interior of the enclosed space rises above a preselected threshold.

Figure 2:
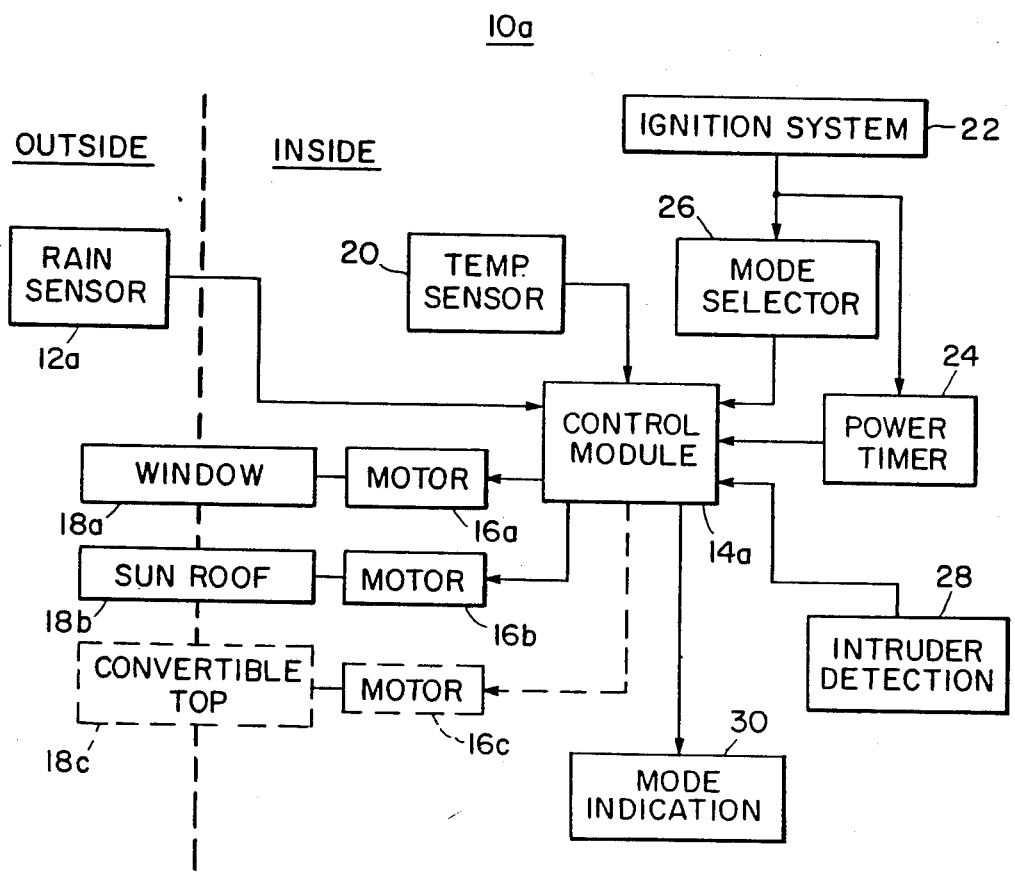
FIG. 2 is a more detailed block diagram of another venting system according to this invention.

Automatic venting system 10a according to this invention, FIG. 2, is designed for a vehicle such as an automobile. System 10a includes rain sensor 12a, temperature sensor 20, and control module 14a. Control module 14 controls one or more window motors 16a having corresponding window 18a and, when present, sunroof motor 16b which operates sunroof 18b. Venting system 10a also accommodates vehicles with convertible roofs, in which case a sunroof is not present. Instead motor 16c, shown in phantom, is commanded to operate convertible top 18c, shown in phantom.

System 10a is enabled by switching the ignition key of ignition system 22 to the OFF position. The operator of the vehicle selects one of four different modes. Mode selector 26 includes a rotary switch which permits the operator to set the mode. Selection of a particular mode is confirmed by mode indication unit 30. The operation of venting system 10a in the four modes is described in relation to FIGS. 3A-3C.

Once system 10a is enabled, power timer 24 permits operation of system 10a for a preselected period of time, such as 12, 24 or 48 hours, after which system 10a is placed in the security mode, described below. All power to system 10a is then shut down. Similarly, intruder detection module 28 changes the operating mode to the security mode when unauthorized entry is detected.

Figure 3A:
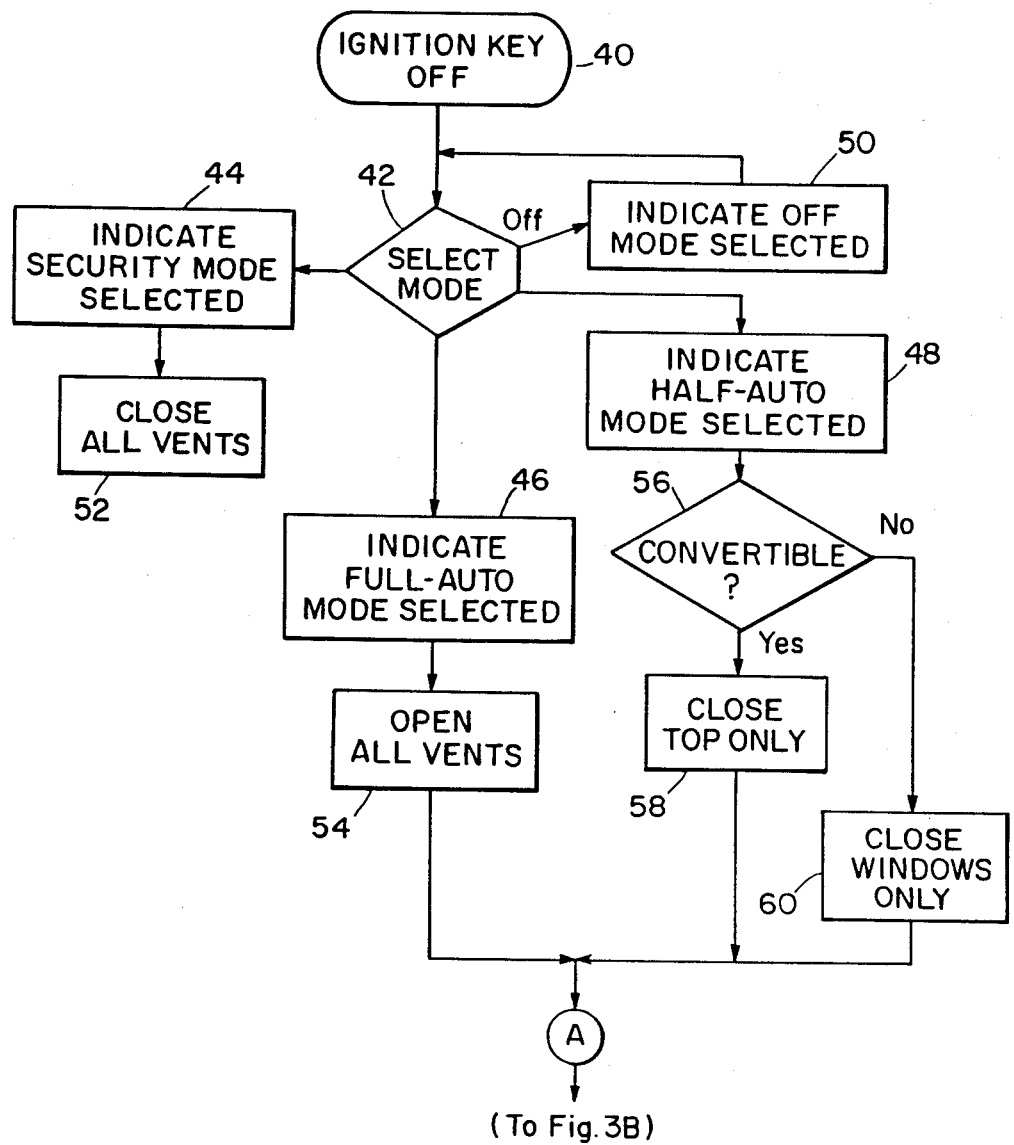
FIGS. 3A–3C are flow charts of the operation of the system shown in FIG. 2.
Figure 3B:
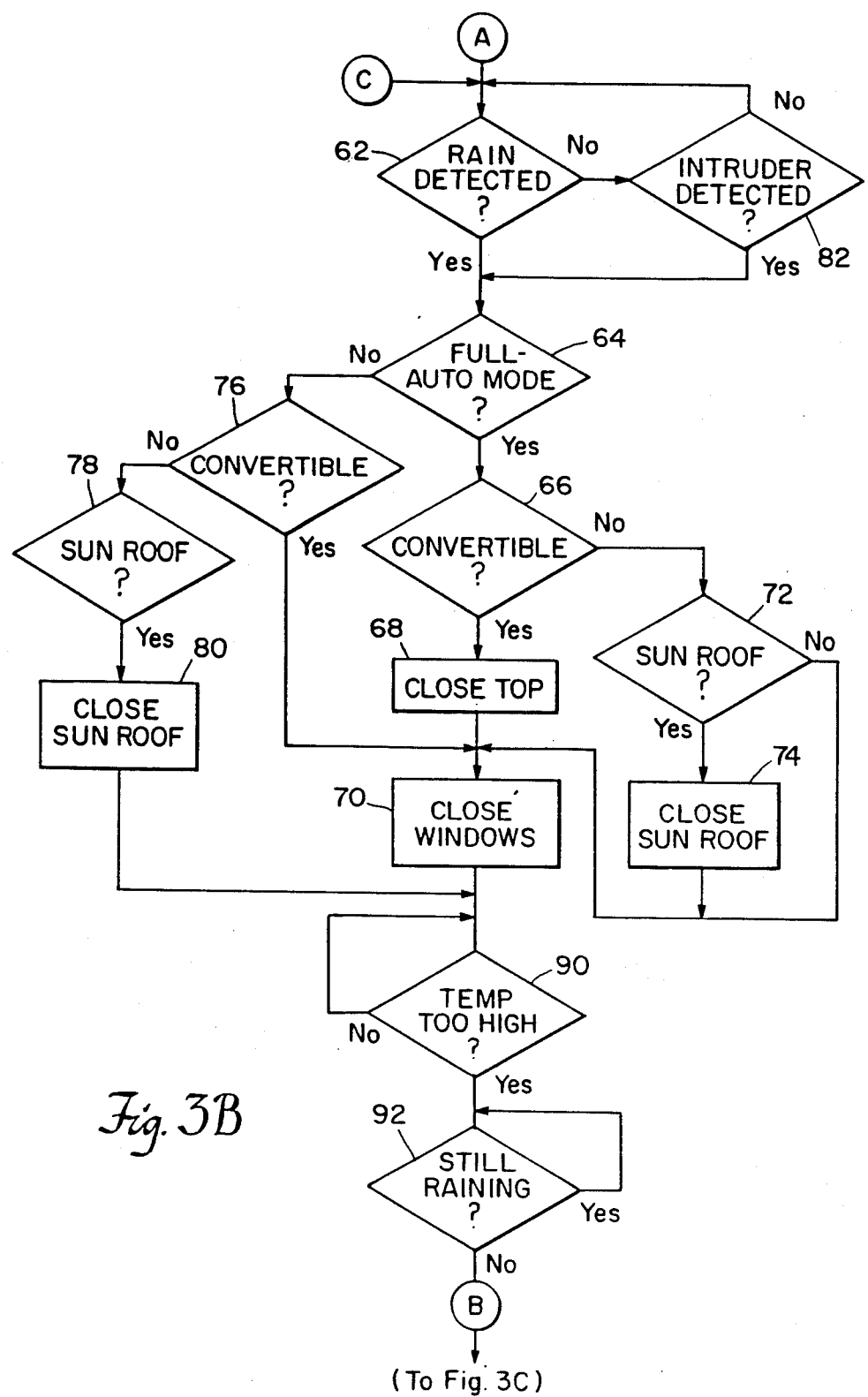
Figure 3C:
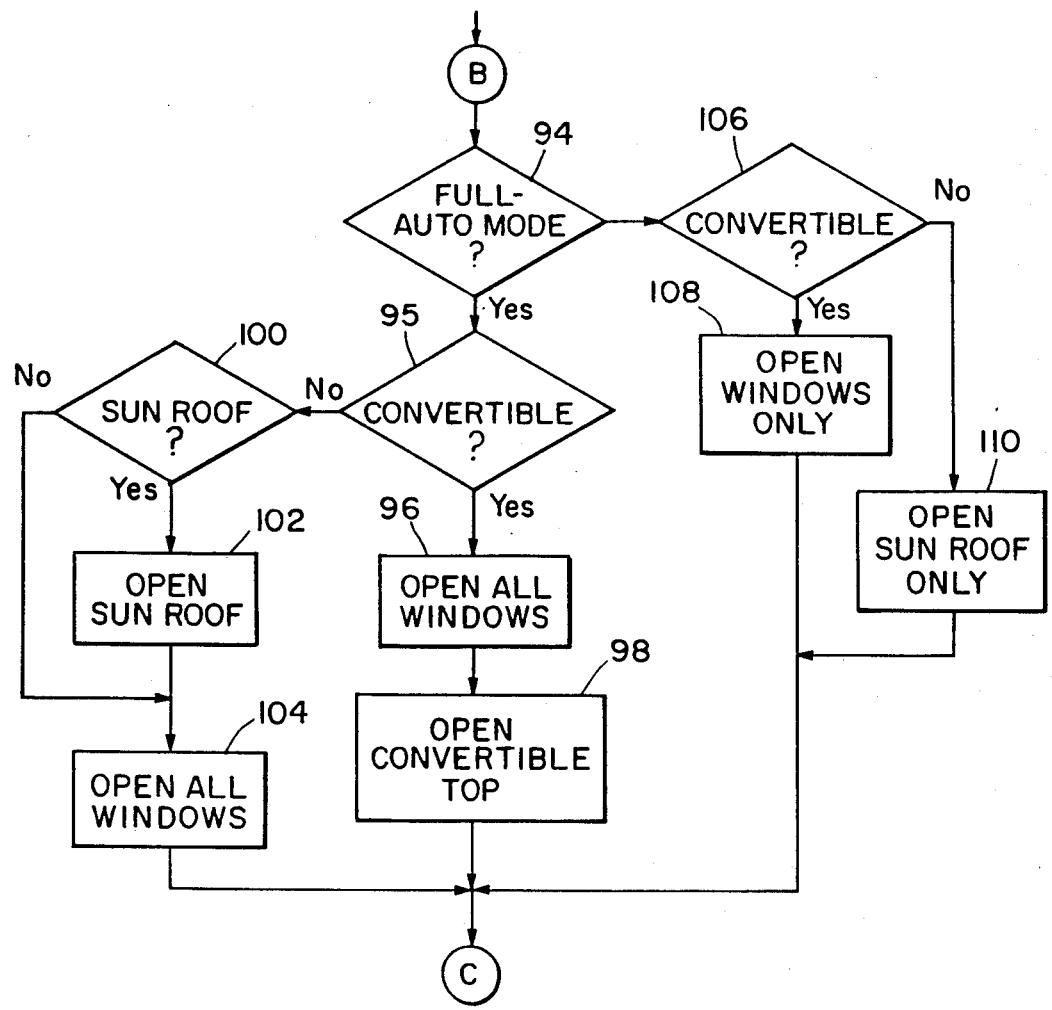

Four modes are selectable as shown in FIGS. 3A-3C. After the ignition key is turned off, step 40, the operator selects a mode in step 42. The selected mode is indicated in steps 44, 46, 48, 50 as "security mode", "full-automatic mode", "half-automatic mode", or "off mode", respectively. The operator is notified of the selected mode by a series of beeps, a lighted display, or both. Typically, the operator selects the mode based on the location of the vehicle. In a city, the security mode is preferred, because all vents are closed, step 52, as soon as the ignition key is turned off. In a safe area, the full-automatic mode is preferred in which all vents are opened, step 54. Alternatively, the venting system is disengaged by placing it in the "off mode", step 50. Also available is the "half-automatic mode", in which preselected vents are opened while others remain closed.

The half-automatic mode is available for vehicles with a sunroof or a convertible top. If the vehicle has a convertible top, as recognized in step 56, the top is closed, step 58, while the windows remain open. If the vehicle does not have a convertible top, and therefore has a sunroof, the windows are closed, step 60, while the sunroof remains open.

In both the full-automatic and half-automatic modes, the system monitors precipitation. If rain is detected, step 62, FIG. 3B, the system operates particular motors depending on the selected mode. If it is determined in step 64 that the system is in the full-automatic mode, and that the vehicle has a convertible top, step 66, the top is closed, step 68, and all windows are closed, step 70. If vehicle has a sunroof, step 72, the sunroof is closed, step 74, after which the windows are closed, step 70. If the vehicle is a convertible in the half-automatic mode, the top is already closed, and therefore the windows are closed, step 76, 70. If the vehicle has a sunroof and is in the half-automatic mode, the sunroof is closed, steps 78, 80. The net result of steps 64–80 is that any vents which were previously opened are now closed.

During the monitoring of precipitation, the system also monitors whether an intruder has been detected, step 82. Intruder detection unit 28, FIG. 2 includes a motion detector such as a mercury switch, a microwave sensor, or a photoelectric device. If unauthorized entry is detected, steps 64–80 are entered; alternatively, the mode of the system is immediately changed to the security mode.

In the full-and half-automatic modes, the windows remain closed as long as the temperature in the passenger space remains below the preselected temperature threshold, step 90. In one construction the threshold is adjustable by the operator of the vehicle, for example between 85 degrees F. and 95 degrees F. If the temperature threshold is exceeded, the system determines whether precipitation has ceased, step 92. Once precipitation is no longer sensed, the system determines which mode it is in and returns the selected vents to the open position while maintaining the nonselected vents in the closed position, steps 94–110, FIG. 3C. The logic then returns to step 62, FIG. 3B. The system continues to enable passive circulation of air through the interior until precipitation or an intruder is detected.

While selected vents have been described as opening completely during the full- and half-automatic mode, this is not a limitation of the invention. Windows, for example, can be opened to the one-quarter or one-half open position. This arrangement can be preselected or can be determined by the operator of the vehicle when a separate closure setting switch is provided.

Further, the automatic venting system can be installed on a boat. Vents on the boat remain open until rain or spray triggers closing of the vents.

Although specific features of the invention are shown in some drawings and not others, this is for convenience only as each features may be combined with any or all of the other features in accordance with the invention.

Other embodiments will occur to those skilled in the art and are within the following claims:

What is claimed is:

1. An automatic venting system for a vehicle, comprising:
   means for sensing precipitation;
   means for determining the temperature of the interior of the vehicle;

a plurality of venting elements in communication with the interior of the vehicle;

drive means for operating each of said venting elements; and control means, responsive to said means for sensing and said means for determining, for commanding in a first mode each said drive means to open its corresponding venting element when the interior temperature rises above a preselected threshold to accomplish venting of the vehicle, and for commanding each said drive means to close its corresponding venting element when precipitation is detected and for commanding in a second, security mode each said drive means to immediately close its corresponding venting element regardless of whether precipitation is sensed.

2. The venting system of claim 1 further including means for selecting one of said first and second modes for said control drive means.

3. The venting system of claim 1 in which each said drive means includes an electric motor and the system further includes means for enabling said control means to command said motors.

4. The venting system of claim 3 in which the vehicle includes an electrical ignition system and said means for enabling is responsive to the ignition system.

5. The venting system of claim 6 further including timer means, responsive to said means for enabling, for signalling said control means to command closure of said venting elements when a predetermined period has elapsed.

6. The venting system of claim 1 further including means for indicating the mode of said control means.

7. The venting system of claim 1 further including intruder detection means for placing said control means in said second mode when an intruder is detected.

8. The venting system of claim 1 in which said control means includes means for commanding in a third mode selected ones of said drive means to open corresponding selected venting elements until precipitation is detected and for commanding nonselected ones of said drive means to close corresponding nonselected venting elements regardless of whether precipitation is sensed.

9. The venting system of claim 1 further including means, actuatable by an operator of the vehicle, for adjusting the preselected threshold for said control means.

10. The venting system of claim 1 in which each said drive means includes an electric motor.

11. An automatic venting system for the passenger space of a vehicle, comprising:

means for sensing precipitation falling on the vehicle;

means for determining the temperature of the passenger space of the vehicle;

a plurality of venting elements, selected from the group consisting of windows, sunroofs and convertible tops, in communication with the passenger space of the vehicle;

drive means for operating each of said venting elements, each said drive means including an electric motor;

control means, responsive to said means for sensing and said means for determining, for commanding in a first mode each said motor to open its corresponding venting element when the temperature of the passenger space rises above a preselected threshold to accomplish venting of the passenger space, and for commanding each said motor to close its corresponding venting element when precipitation is detected;

said control means including means for commanding in a second, security mode each said motor to immediately close its respective venting element regardless of whether precipitation is sensed;

said control means further including means for commanding in a third mode selected ones of said motors to open, when the temperature of the passenger space rises above the preselected threshold, corresponding selected venting elements until precipitation is detected and for commanding nonselected ones of said motors to close corresponding nonselected venting elements regardless of whether precipitation is sensed; and means, actuated by an operator of the vehicle, for selecting one of said first, second and third modes for said control means.

12. The venting system of claim 11 further including means for enabling said control means to command said motors.

13. The venting system of claim 12 further including timer means, responsive to said means for enabling, for signalling said control means to command closure of said venting elements when a predetermined period has elapsed.

14. The venting system of claim 11 further including intruder detection means for placing said control means in said second mode when an intruder is detected.

15. An automatic venting system for the passenger space of an automobile having a number of windows and an electrical drive mechanism for operating each of the windows, the system comprising:

means for sensing precipitation;

means for determining the temperature of the passenger space of the automobile;

control means, responsive to said means for sensing and said means for determining, for commanding in a first mode each said drive mechanism to open its corresponding venting element when the temperature of the passenger space rises above a preselected threshold to accomplish venting of the passenger space, and for commanding each said drive mechanism to close its corresponding venting element when precipitation is detected;

said control means including means for commanding in a second, security mode each said drive mechanism to immediately close its respective venting element regardless of whether precipitation is sensed; and means, actuated by an operator of the automobile, for selecting one of said first and second modes for said control means.

16. The venting system of claim 15 in which the automobile includes an electrical ignition system and the system further includes means for enabling said control means to command said drive mechanisms when the ignition system is off.

17. The venting system of claim 15 in which said control means further includes means for reopening venting elements, closed upon sensing of precipitation, only after the temperature of the passenger space rises above the preselected threshold.

18. The venting system of claim 15 in which said control means further includes means for commanding in a third mode selected ones of said drive mechanisms to open, when the temperature of the passenger space rises above the preselected threshold, corresponding selected venting elements until precipitation is sensed and for commanding nonselected ones of said drive mechanisms to close corresponding nonselected venting elements regardless of whether precipitation is sensed, and said means for selecting is actuable by the operator to select one of said first, second, and third modes.

19. The venting system of claim 18 in which the automobile includes one of a sunroof and a convertible top designated as selected venting elements for said control means in said third mode.

* * * * *